US008327211B2

United States Patent
Zopf

(10) Patent No.: US 8,327,211 B2
(45) Date of Patent: Dec. 4, 2012

(54) VOICE ACTIVITY DETECTION (VAD) DEPENDENT RETRANSMISSION SCHEME FOR WIRELESS COMMUNICATION SYSTEMS

(75) Inventor: Robert W. Zopf, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 963 days.

(21) Appl. No.: 12/359,700

(22) Filed: Jan. 26, 2009

(65) Prior Publication Data

US 2010/0192033 A1   Jul. 29, 2010

(51) Int. Cl.
*G08C 25/02*   (2006.01)
(52) U.S. Cl. ............................................. 714/748
(58) Field of Classification Search .................... 714/748
See application file for complete search history.

(56) References Cited

U.S. PATENT DOCUMENTS

| | | | | |
|---|---|---|---|---|
| 2002/0004375 A1* | 1/2002 | Spencer et al. | ............ | 455/277.1 |
| 2002/0172192 A1* | 11/2002 | Hunzinger et al. | ............ | 370/352 |
| 2007/0055494 A1* | 3/2007 | Kashiwase | ............ | 704/9 |
| 2008/0299987 A1* | 12/2008 | Iyer et al. | ............ | 455/454 |
| 2009/0017879 A1* | 1/2009 | Tsfaty et al. | ............ | 455/574 |
| 2009/0080415 A1* | 3/2009 | LeBlanc | ............ | 370/352 |
| 2010/0020729 A1* | 1/2010 | Walley et al. | ............ | 370/277 |

OTHER PUBLICATIONS

"https://www.bluetooth.org/Technical/Specifications/adopted.htm," Bluetooth Special Interest Group.*

* cited by examiner

*Primary Examiner* — Scott Baderman
*Assistant Examiner* — Neil Miles
(74) *Attorney, Agent, or Firm* — Fiala & Weaver P.L.L.C.

(57) ABSTRACT

A voice activity detection (VAD) dependent retransmission scheme is described that mitigates the effect of packet loss on an audio signal transmitted between terminals in a wireless communication system in a manner that is generally more robust than conventional state-of-the art packet loss concealment algorithms but that consumes less terminal power as compared to conventional retransmission schemes. In one implementation, this is achieved by allowing retransmissions to be requested by a terminal only when a packet received by the terminal is deemed bad and when a portion of an audio signal currently being received by the terminal is deemed to comprise active speech. In other implementations, the processing of retransmission requests received by a terminal is inhibited or turned off entirely during periods when a portion of an audio signal currently being transmitted by the terminal is deemed not to comprise active speech.

22 Claims, 13 Drawing Sheets

VOICE ACTIVITY DETECTION (VAD) DEPENDENT RETRANSMISSION SCHEME FOR WIRELESS COMMUNICATION SYSTEMS

BACKGROUND OF THE INVENTION

1. Field of the Invention

The present invention relates to systems and methods for mitigating the effects of packet loss on an audio signal, such as a speech signal, that is transmitted between terminals in a wireless communication system. The present invention also relates to systems and methods for reducing the amount of power consumed by such terminals.

2. Background

In wireless communication systems that include battery-operated terminals, a major design consideration for the terminals is minimizing power consumption. For example, in a Bluetooth® wireless communication system, it is desirable to reduce the amount of power consumed by a battery-operated Bluetooth® terminal (such as a Bluetooth® headset) in order to enable longer periods of use between battery recharging or replacement.

In many wireless communication systems, impairments on a wireless channel can result in the loss of packets transmitted between terminals. Where the packets carry information representative of an audio signal, such as a speech signal, such packet loss can result in a perceptible reduction in the quality and intelligibility of the audio signal when played back to a user. To address this issue, some of these systems provide a mechanism by which a transmitting terminal can retransmit lost packets to a receiving terminal. For example, version 1.2 of the Bluetooth® Core Specification and all subsequent versions thereof define an audio transport mechanism—termed the Extended Synchronous Connection Oriented (eSCO) channel—that allows for the retransmission of lost packets between Bluetooth® terminals. This functionality can significantly improve the reliability of a wireless link between the two terminals, thereby facilitating the delivery of high-quality audio content, such as speech, even in poor transmission conditions. Unfortunately, however, implementation of the retransmission scheme increases power consumption by both terminals.

Terminals in wireless communication systems that transport speech or audio may also employ Packet Loss Concealment (PLC) to conceal the effects of lost packets on an audio signal. PLC algorithms take advantage of redundancy in a received audio waveform to conceal the effects of the lost data on the audio signal. While current state-of-the-art PLC algorithms perform reasonably well in mitigating the effects of packet loss on an audio stream, such algorithms are typically not capable of delivering the same level of quality as a retransmission scheme when the level of impairment on the wireless channel becomes significant.

What is needed, then, is an improved system and method for mitigating the effects of packet loss on an audio signal transmitted between terminals in a wireless communication system. In particular, the desired system and method should operate more robustly than conventional state-of-the art PLC algorithms during significant channel impairments but also consume less terminal power as compared to conventional retransmission schemes.

BRIEF SUMMARY OF THE INVENTION

An embodiment of the present invention mitigates the effect of packet loss on an audio signal transmitted between terminals in a wireless communication system in a manner that is generally more robust than conventional state-of-the art PLC algorithms but that consumes less terminal power as compared to conventional retransmission schemes. In one implementation, this is achieved by allowing retransmissions to be requested by a terminal only when a packet received by the terminal is deemed bad and when a portion of an audio signal currently being received by the terminal is deemed to comprise active speech.

A further implementation of the present invention also inhibits the processing of retransmission requests received by a terminal during periods when a portion of an audio signal currently being transmitted by the terminal is deemed not to comprise active speech, thereby conserving power. Such an implementation may force the terminal that generated the retransmission request to employ a PLC algorithm to conceal the effect of any lost packets received during such periods. However, since the transmitted audio signal does not currently contain active speech, a far-end listener will perceive insignificant performance degradation.

In a still further implementation of the present invention in which each of two terminals communicating via a wireless channel implements a VAD-dependent retransmission request scheme as discussed above, each terminal may be adapted to turn off an antenna that monitors for retransmission requests and/or logic that demodulates/decodes such requests during periods when a portion of an audio signal being transmitted by the terminal is deemed not to comprise active speech, thereby conserving power. This is because the application of the VAD-dependent retransmission request scheme by the other terminal will ensure that no retransmission requests are generated during these time periods.

In particular, a method for selectively issuing retransmission requests by a terminal in a wireless communication system is described herein. In accordance with the method, it is determined whether a packet received over a wireless channel from a remote terminal and carrying encoded audio samples representative of a frame of an audio signal is deemed bad. Responsive to determining that the packet is deemed bad, the following steps are performed: first, it is determined whether voice activity has been detected in the audio signal based on an analysis of at least one previously-received frame of the audio signal; then, a retransmission request is generated for the packet for transmission to the remote terminal responsive to determining that voice activity has been detected.

A terminal for use in a wireless communication system is also described herein. The terminal includes a demodulator/channel decoder, a voice activity detector, and a retransmission request generator connected to the demodulator/channel decoder and the voice activity detector. The demodulator/channel decoder is configured to determine whether a packet received over a wireless channel from a remote terminal and carrying encoded audio samples representative of a frame of an audio signal is deemed bad. The voice activity detector is configured to determine whether voice activity has been detected in the audio signal based on an analysis of at least one previously-received frame of the audio signal. The retransmission request generator is configured to generate a retransmission request for the packet for transmission to the remote terminal responsive to a determination by the demodulator/channel decoder that the packet is deemed bad and to a determination by the voice activity detector that voice activity has been detected in the audio signal.

A method for selectively processing retransmission requests received by a terminal in a wireless communication system is also described herein. In accordance with the method, a retransmission request is received from a remote terminal for a packet previously transmitted to the remote terminal over a wireless channel, wherein the packet carried encoded audio samples representative of a frame of an audio signal. Responsive to receiving the retransmission request, the following steps are performed: first, it is determined whether voice activity has been detected in the audio signal based on an analysis of at least one previously-processed frame of the audio signal; then, the retransmission request is processed responsive to determining that voice activity has been detected, wherein processing the retransmission request includes retransmitting the packet to the remote terminal.

Yet another terminal for use in a wireless communication system is described herein. The terminal includes a demodulator/channel decoder, a voice activity detector, and a retransmission request processor connected to the demodulator/channel decoder and the voice activity detector. The demodulator/channel decoder is configured to receive a retransmission request from a remote terminal for a packet previously transmitted to the remote terminal over a wireless channel, wherein the packet carried encoded audio samples representative of a frame of an audio signal. The voice activity detector is configured to determine whether voice activity has been detected in the audio signal based on an analysis of at least one previously-processed frame of the audio signal. The retransmission request processor is configured to receive the retransmission request from the demodulator/channel decoder and to process the retransmission request responsive to a determination by the voice activity detector that voice activity has been detected in the audio signal, wherein processing the retransmission request includes retransmitting the packet to the remote terminal.

A method for managing the processing of retransmission requests by a terminal in a wireless communication system is also described herein. In accordance with the method, an audio signal to be transmitted to a remote terminal over a wireless channel is monitored to determine whether voice activity has been detected in the audio signal. Responsive to determining that no voice activity has been detected in the audio signal, an antenna that monitors the wireless channel for retransmission requests and/or logic that demodulates/decodes such retransmission requests from the remote terminal is turned off.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
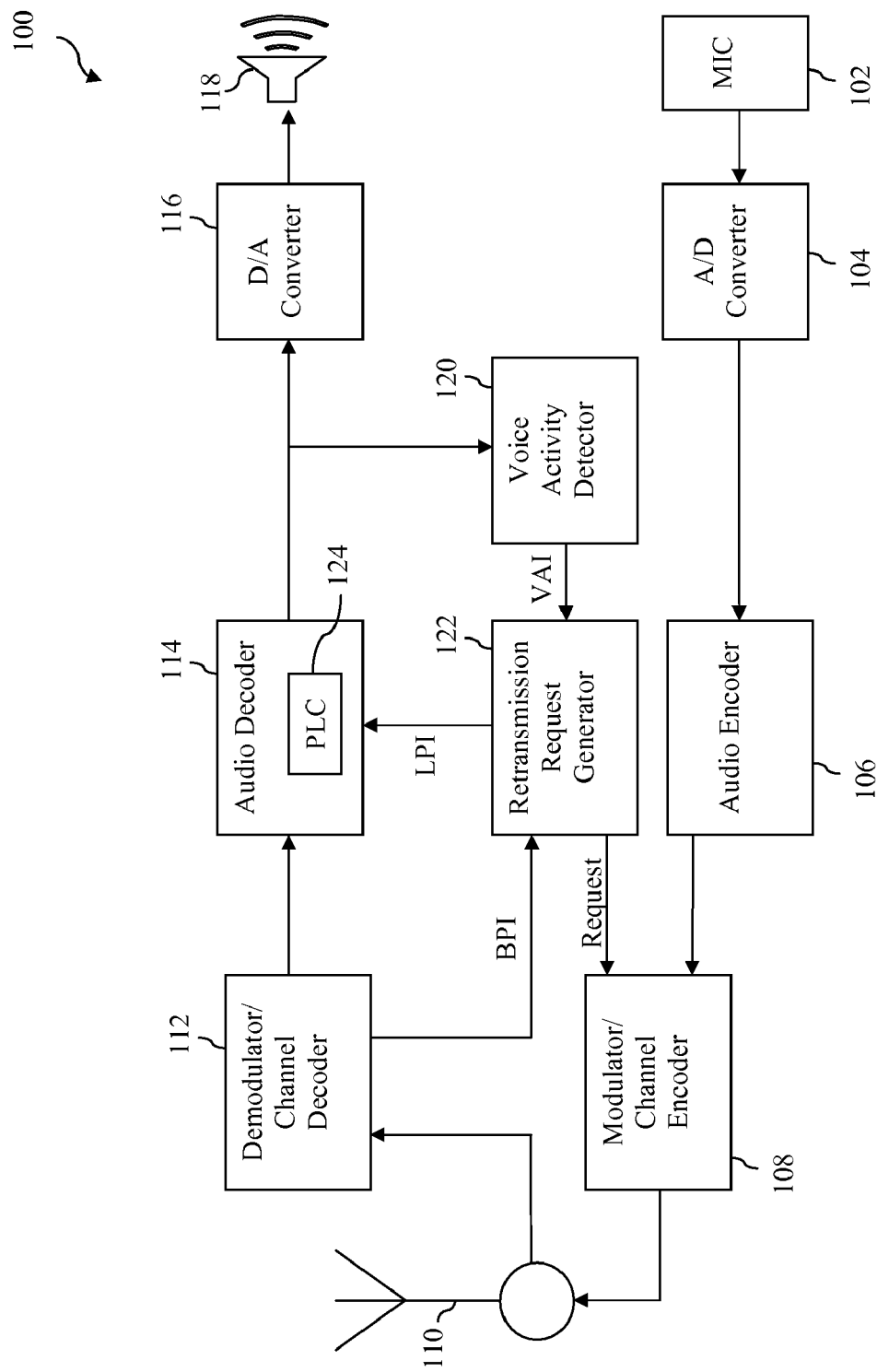
FIG. 1 is a block diagram of an example wireless communication terminal that implements a voice activity detector (VAD) dependent retransmission request generation scheme in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

An embodiment of the present invention mitigates the effect of packet loss on an audio signal transmitted between terminals in a wireless communication system in a manner that is generally more robust than conventional state-of-the art packet loss concealment (PLC) algorithms but that consumes less terminal power as compared to conventional retransmission schemes. In one implementation, this is achieved by allowing retransmissions to be requested by a terminal only when a packet received by the terminal is deemed bad and when a portion of an audio signal currently being received by the terminal is deemed to comprise active speech. The determination of whether or not the packet received by the terminal is deemed bad may be made based on error detection operations performed on the packet by the receiving terminal. The determination of whether the portion of the audio signal currently being received by the terminal is deemed to comprise active speech may be made by a voice activity detector included within the receiving terminal.

It has been observed that, during a typical telephone conversation, each speaker is actively speaking about 40% of the time. During these periods of active speech, it is important that distortion due to packet loss be minimized. As noted above, an embodiment of the present invention addresses this issue by allowing retransmission requests to be issued by a terminal during periods of active speech. This serves to reduce the effective packet loss rate and improve the perceived speech quality and intelligibility.

However, during the approximately 60% of the time that a speaker is not speaking, only silence or background noise can be conveyed from the speaker's terminal. Packet loss during this time will have a very minimal impact on the overall perceived conversational quality as long an adequate PLC algorithm is applied by the receiving terminal. In view of this, an embodiment of the present invention inhibits the generation of retransmission requests during periods in which an audio signal currently being received by a terminal is deemed not to comprise active speech, allowing a PLC algorithm in the receiving terminal to handle the packet loss. Since the transmitting terminal will not have to retransmit any lost packets during these periods, it can conserve power.

A further implementation of the present invention also inhibits the processing of retransmission requests received by a terminal during periods when a portion of an audio signal currently being transmitted by the terminal is deemed not to comprise active speech, thereby conserving power. Such an implementation may force the terminal that generated the retransmission request to employ a PLC algorithm to conceal the effect of any lost packets received during such periods. However, since the transmitted audio signal does not currently contain active speech, a far-end listener will perceive insignificant performance degradation.

In a still further implementation of the present invention in which each of two terminals communicating via a wireless channel implements a VAD dependent retransmission request scheme as discussed above, each terminal may be adapted to turn off an antenna that monitors for retransmission requests and/or logic that demodulates/decodes such requests during periods when a portion of an audio signal being transmitted by the terminal is deemed not to comprise active speech, thereby conserving power. This is because the application of the VAD dependent retransmission request scheme by the other terminal will ensure that no retransmission requests are generated during these time periods.

Embodiments of the present invention will be described herein that may be implemented in terminals of a Bluetooth® wireless communication system. It is noted, however, that the present invention is not limited to Bluetooth® wireless communication systems and terminals. Rather, the present invention may advantageously be implemented in terminals of any communication system in which information representative of an audio signal is transmitted between terminals and in which retransmissions may be performed.

Furthermore, although retransmission schemes are described herein that are dependent on the output of a VAD, persons skilled in the relevant art(s) will readily appreciate that such retransmission schemes may also be made dependent on the detection of other types of audio activity, including but not limited to music.

B. Example Retransmission Request Generation Scheme

FIG. 1 is a high-level block diagram of an example wireless communication terminal 100 that implements a voice activity detection (VAD) dependent retransmission request generation scheme in accordance with an embodiment of the present invention. For the purposes of this description it will be assumed that wireless communication terminal 100 represents a terminal in a Bluetooth® wireless communication system. Such a terminal may comprise, for example, a Bluetooth®-enabled telephone or headset.

As shown in FIG. 1, wireless communication terminal 100 comprises a number of interconnected components including a microphone 102, an analog-to-digital (A/D) converter 104, an audio encoder 106, a modulator/channel encoder 108, an antenna 110, a demodulator/channel decoder 112, an audio decoder 114, a digital-to-analog (D/A) converter 116, a speaker 118, a voice activity detector 120 and a retransmission request generator 122. Each of these elements will now be briefly described.

Microphone 102 is an acoustic-to-electric transducer that operates in a well-known manner to convert sound waves into an analog audio signal. A/D converter 104 is connected to microphone 102 and is adapted to convert the analog audio signal produced by microphone 102 into a series of digital audio samples. An amplifier (not shown in FIG. 1) may optionally be connected between microphone 102 and A/D converter 104 to amplify the analog audio signal produced by microphone 102 prior to processing by A/D converter 104. In an embodiment, the digital audio samples produced by A/D converter 104 comprise Pulse Code Modulated (PCM) samples.

Audio encoder 106 is adapted to receive the series of digital audio samples generated by A/D converter 104 and to compress each digital audio sample in the series in accordance with an audio encoding technique. For example, audio encoder 102 may compress each digital audio sample in accordance with a CVSD (Continuously Variable Slope Delta), A-law or μ-law audio encoding technique. Depending upon the implementation, various speech and/or audio optimization techniques may be applied to the digital audio samples prior to application of the audio encoding technique by audio encoder 106.

Modulator/channel encoder 108 is adapted to generate packets that include a fixed number of encoded audio samples produced by audio encoder 106 and to prepare such packets for transmission over a wireless communication channel. The wireless communication channel may comprise, for example, a Bluetooth® Extended Synchronous Connected Oriented (eSCO) channel. In accordance with such an embodiment, packet generation may include generating a packet in accordance with any of the EV3, EV4 or EV5 packet types defined for eSCO channels by the Bluetooth® Core Specification (a current version of which is entitled BLUETOOTH SPECIFICATION Version 2.1+EDR, Jul. 26, 2007, the entirety of which is incorporated by reference herein). The preparation of a packet for transmission over the wireless communication channel may comprise, for example, modulating a carrier signal according to the packet information and transmitting the modulated carrier signal during one or more time slots and across a plurality of frequency bands in accordance with a combined time division multiplexing and frequency hopping technique. The modulated carrier signal is transmitted using antenna 110.

Demodulator/channel decoder 112 is configured to receive a modulated carrier signal from antenna 110 and to demodulate the modulated carrier signal to generate a packet of encoded audio samples. The packet may comprise, for example, an EV3, EV4 or EV5 type packet as discussed above. Demodulator/channel decoder 112 is further configured to apply error detection and/or error correction techniques to the packet to determine whether or not the packet is suitable for subsequent decoding. The application of these techniques may include, for example and without limitation, determining if more than a predefined number of bits of a sync word portion of the packet are in error, analyzing header error check (HEC) bits in a header portion of the packet to determine if the packet header has been corrupted, analyzing FEC information included in the packet header to detect and correct errors in the packet header, and/or analyzing cyclic redundancy check (CRC) information included within a payload portion of the packet to determine if the payload has been corrupted. If demodulator/channel decoder 112 determines that the packet is not suitable for audio decoding, the packet is deemed bad and demodulation/channel decoder 112 sends a bad packet indicator (BPI) signal to retransmission request generator 122.

If, however, demodulator/channel decoder 112 determines that the packet is suitable for audio decoding, then demodulator/channel decoder 112 provides a series of encoded audio samples from within the packet to audio decoder 114. Audio decoder 114 is adapted to decompress each encoded audio sample in the series in accordance with an audio decoding technique to generate a series of digital audio samples. For example, audio decoder 114 may decompress the encoded audio samples in accordance with a CVSD, A-law or μ-law audio decoding technique. In an embodiment, the digital audio samples produced by audio decoder 114 comprise a frame of Pulse Code Modulated (PCM) samples.

As shown in FIG. 1, audio decoder 114 comprises packet loss concealment (PLC) logic 124. PLC logic 124 is configured to monitor a lost packet indicator (LPI) signal that is selectively asserted by retransmission request logic 122 to determine when a packet has been deemed lost by retransmission request logic 122. Responsive to determining that a packet has been deemed lost, PLC logic 124 is configured to perform operations to synthesize a series of digital audio samples to replace the digital audio samples that would have otherwise been produced through the audio decoding of the encoded audio samples carried by the lost packet. A variety of PLC techniques are known in the art for performing this function. Many of these techniques use some form of time or frequency extrapolation of the decoded audio waveform preceding the waveform represented by the lost encoded audio samples to generate replacement samples. In implementations where subsequently-received audio samples are available (e.g., through the introduction of a look-ahead delay), some form of time or frequency interpolation of the decoded audio waveform preceding and following the waveform represented by the lost encoded audio samples may be used.

D/A converter 116 is connected to audio decoder 114 and is adapted to convert digital audio samples produced by audio decoder 114 (either through audio decoding operations or PLC operations) into an analog audio signal. A speaker 118 comprising an electromechanical transducer is connected to D/A converter 116 and operates in a well-known manner to convert the analog audio signal into sound waves for perception by a user.

Voice activity detector 120 is also connected to audio decoder 114 and is adapted to analyze digital audio samples produced by audio decoder 114 to determine whether or not those samples represent voice activity (i.e., human speech) or not. In an embodiment, voice activity detector 120 is configured to render a voice activity determination for each frame of digital audio samples produced by audio decoder 114. This determination may be based on an analysis of the frame itself and/or upon an analysis of one or more previously-processed frames. If voice activity detector 120 determines that a frame of digital audio signals produced by audio decoder 114 comprises voice activity, voice activity detector 120 will send a voice activity indicator (VAI) signal to retransmission request generator 122.

Figure 2:
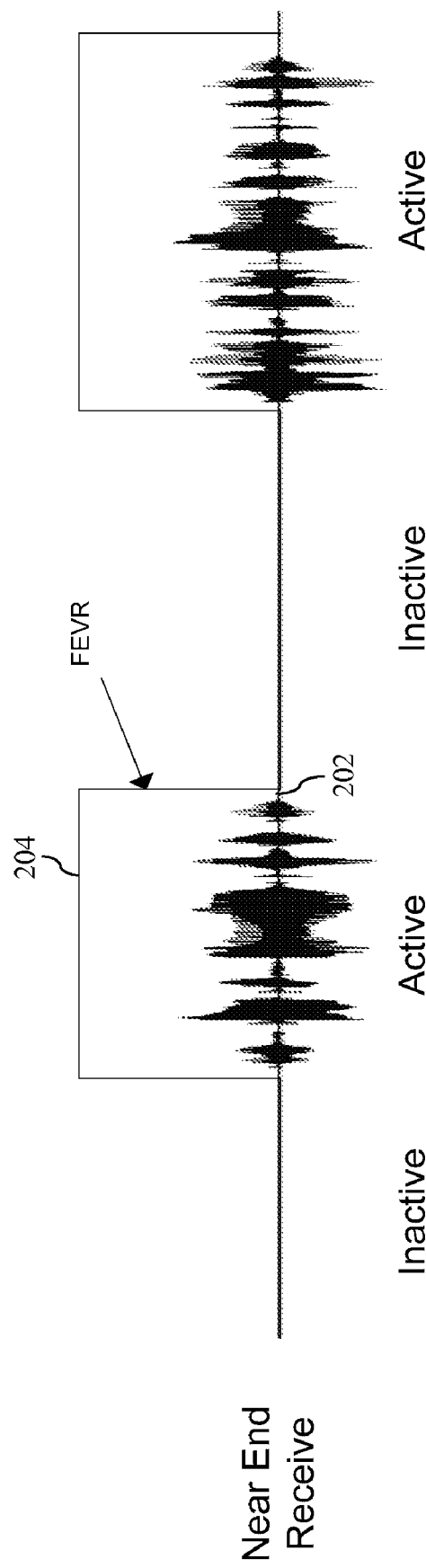
FIG. 2 illustrates an example audio signal produced by an audio decoder and a corresponding signal produced by a voice activity detector based on an analysis of the audio signal in accordance with an embodiment of the present invention.

To further illustrate the operation of voice activity detector 120, FIG. 2 illustrates an example audio signal 202 produced by audio decoder 114 and a signal 204 overlaid thereon. Signal 204, denoted "FEVR" (for Far End VAD Receive), is produced by voice activity detector 120 based on an analysis of audio signal 202. As shown in FIG. 2, signal 204 is generally high during periods of active speech in audio signal 202 and generally low during inactive periods. In one embodiment, signal 204 is used as the VAI signal provided to retransmission request generator 122.

Retransmission request generator 122 is connected to demodulator/channel decoder 112, voice activity detector 120 and modulator/channel encoder 108. Retransmission request generator 122 is adapted to selectively generate a retransmission request for transmission to a remote wireless communication terminal when it is determined that a packet received from the remote wireless communication terminal has been deemed bad by demodulator/channel decoder 112. As previously described, this condition is determined by the state of the BPI signal which is controlled by demodulator/channel decoder 112.

In an embodiment, retransmission request generator 122 will generate a retransmission request corresponding to a bad packet when (1) voice activity detector 120 has asserted the VAI signal, indicating that audio decoder 114 is currently producing a frame that includes active speech and (2) a maximum number of retransmission requests generated for the packet has not been reached. The maximum number of retransmission requests is a configurable parameter that is determined during establishment of an eSCO channel with the remote wireless communication terminal.

In a particular implementation, an exception to the foregoing approach is implemented such that retransmission request generator 122 will generate a retransmission request corresponding to a bad packet whenever the previous packet has been lost and the maximum number of retransmissions has not been reached regardless of whether or not the VAI signal is asserted. Such a constraint may be imposed to avoid generation of potential artifacts by PLC logic 124 due to consecutive packet losses.

If retransmission request generator 122 determines that a retransmission request should be generated, it generates the request and provides it to modulator/channel encoder 108. Modulator/channel encoder 108 encodes the request and transmits it via antenna 110 to the remote wireless communication terminal. Retransmission request generator 122 then increments the total number of retransmission requests generated for the packet.

If retransmission request generator 122 determines that a request should not be generated for a bad packet, then retransmission request generator deems the packet lost and sends a lost packet indicator (LPI) signal to audio decoder 114. As noted above, in response to receiving the LPI signal, PLC logic 124 within audio decoder 114 will operate to synthesize digital audio samples to replace the digital audio samples that would have otherwise been produced through the audio decoding of the encoded audio samples carried by the lost packet.

Figure 3:
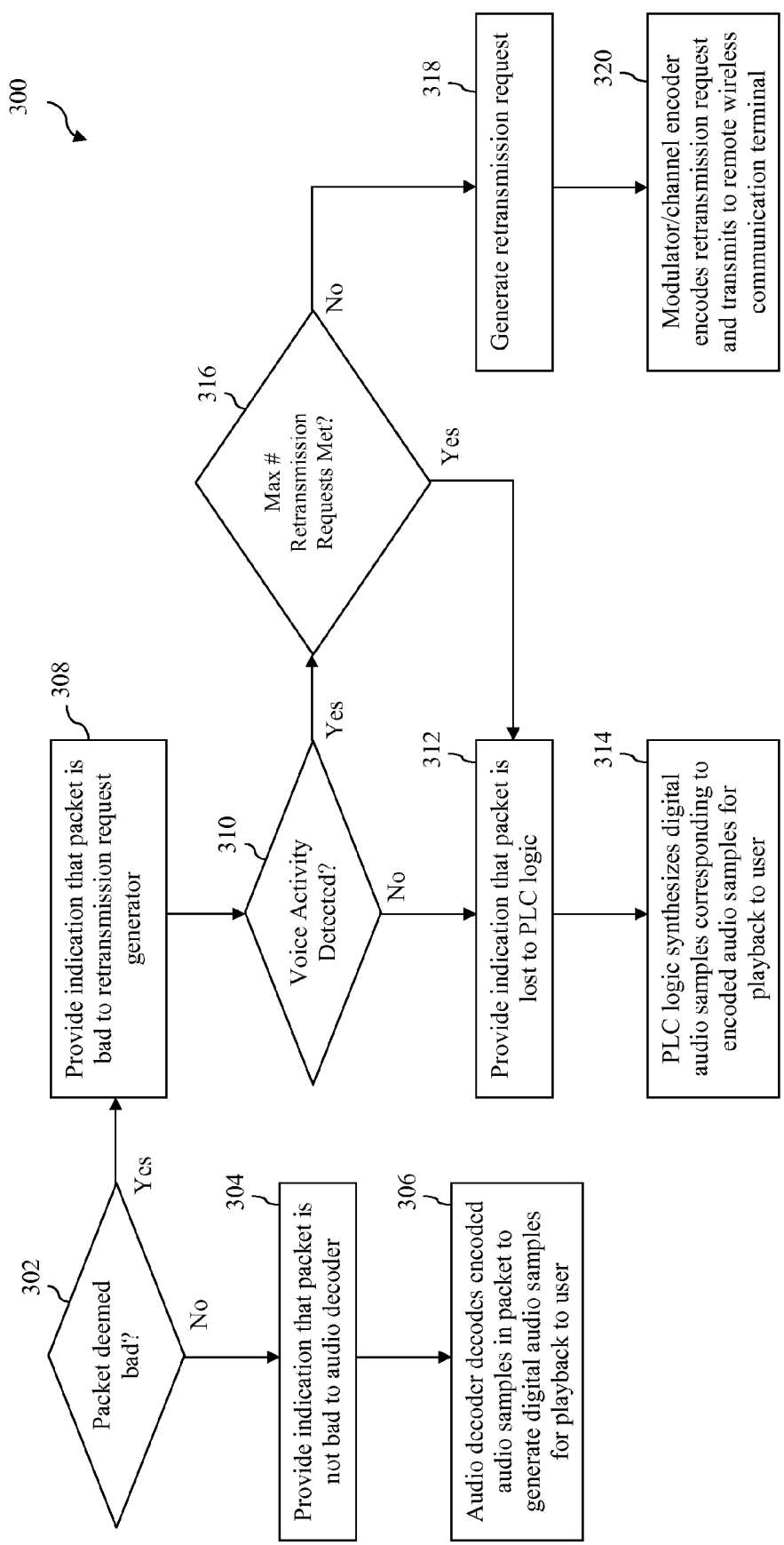
FIG. 3 depicts a flowchart of a method for performing VAD-dependent retransmission request generation in a wireless communication terminal in accordance with an embodiment of the present invention.

The manner in which terminal 100 operates to perform VAD-dependent retransmission request generation will now be further described in reference to flowchart 300 of FIG. 3. As shown in FIG. 3, the method begins at decision step 302 in which demodulator/channel decoder 112 determines whether a packet received from a remote wireless communication terminal is deemed bad. The packet carries encoded audio samples representative of a frame of an audio signal. As noted above, demodulator/channel decoder 112 may determine whether the packet is bad by performing error detection and/or error correction operations on the packet.

If demodulator/channel decoder 112 determines during decision step 302 that the packet is not bad, then demodulator/channel decoder 112 provides an indication that the packet is not bad to audio decoder 114 as shown at step 304. Responsive to receiving the indication that the packet is not bad, audio decoder 114 decodes the encoded audio samples in the packet to generate digital audio samples for playback to a user of terminal 100 as shown at step 306. As discussed above, playback of the digital audio samples comprises converting the digital audio samples into an analog audio signal by D/A converter 116 and playing back the analog audio signal by speaker 118.

If demodulator/channel decoder 112 determines during decision step 302 that the packet is bad then demodulator/channel decoder 112 provides an indication that the packet is bad to retransmission request generator 122 as shown at step 308. As discussed above, demodulator/channel decoder 112 provides this indication by sending a BPI signal to retransmission request generator 122.

Responsive to receiving the indication that the packet is bad, retransmission request generator 122 determines whether voice activity has been detected in the audio signal as shown at decision step 310. As discussed above, the presence of voice activity in the audio signal is detected by voice activity detector 120 based on an analysis of at least one previously-received frame of the audio signal and is indicated through the assertion of VAI signal.

If retransmission request generator 122 determines during decision step 310 that no voice activity has been detected, then retransmission request generator 122 provides an indication to PLC logic 124 within audio decoder 114 that the packet has been lost as shown at step 312. As discussed above, retransmission request generator 122 provides this indication by sending the LPI signal to PLC logic 124. Responsive to receiving the indication that the packet has been lost, PLC logic 124 synthesizes digital audio samples corresponding to the encoded audio samples that were carried by the lost packet for playback to user as shown at step 314. As discussed above, playback of the digital audio samples comprises converting the digital audio samples into an analog audio signal by D/A converter 116 and playing back the analog audio signal by speaker 118.

If retransmission request generator 122 determines during decision step 310 that voice activity has been detected, then retransmission request generator 122 determines whether a maximum number of retransmission requests have already been generated for the packet as shown at step 316. If the maximum number of retransmission requests have already been generated, then retransmission request generator 122 performs step 312 as previously described and, responsive to the performance of step 312, PLC logic 124 performs step 314 as previously described.

If retransmission request generator 122 determines during decision step 316 that the maximum number of retransmission requests have not already been generated for the packet, then retransmission request generator 122 generates a retransmission request for the packet as shown at step 318. During step 318, retransmission request generator 122 also increments the total number of retransmission requests generated for the packet. At step 320, modulator/channel encoder 108 encodes the retransmission request and transmits it via antenna 110 to the remote wireless communication terminal from which the lost packet was received.

The foregoing VAD-dependent retransmission request generation scheme advantageously reduces the number of retransmissions that the remote wireless communication terminal must perform due to packet loss. Hence, the remote wireless communication terminal will yield the power-conservation benefits of the VAD-dependent retransmission request generation scheme implemented by wireless communication terminal 100. The foregoing VAD-dependent retransmission generation scheme will also reduce the amount of power consumed by wireless communication terminal 100, since terminal 100 will have less retransmitted packets to receive, demodulate, decode and process.

C. Example Retransmission Request Processing Scheme

Figure 4:
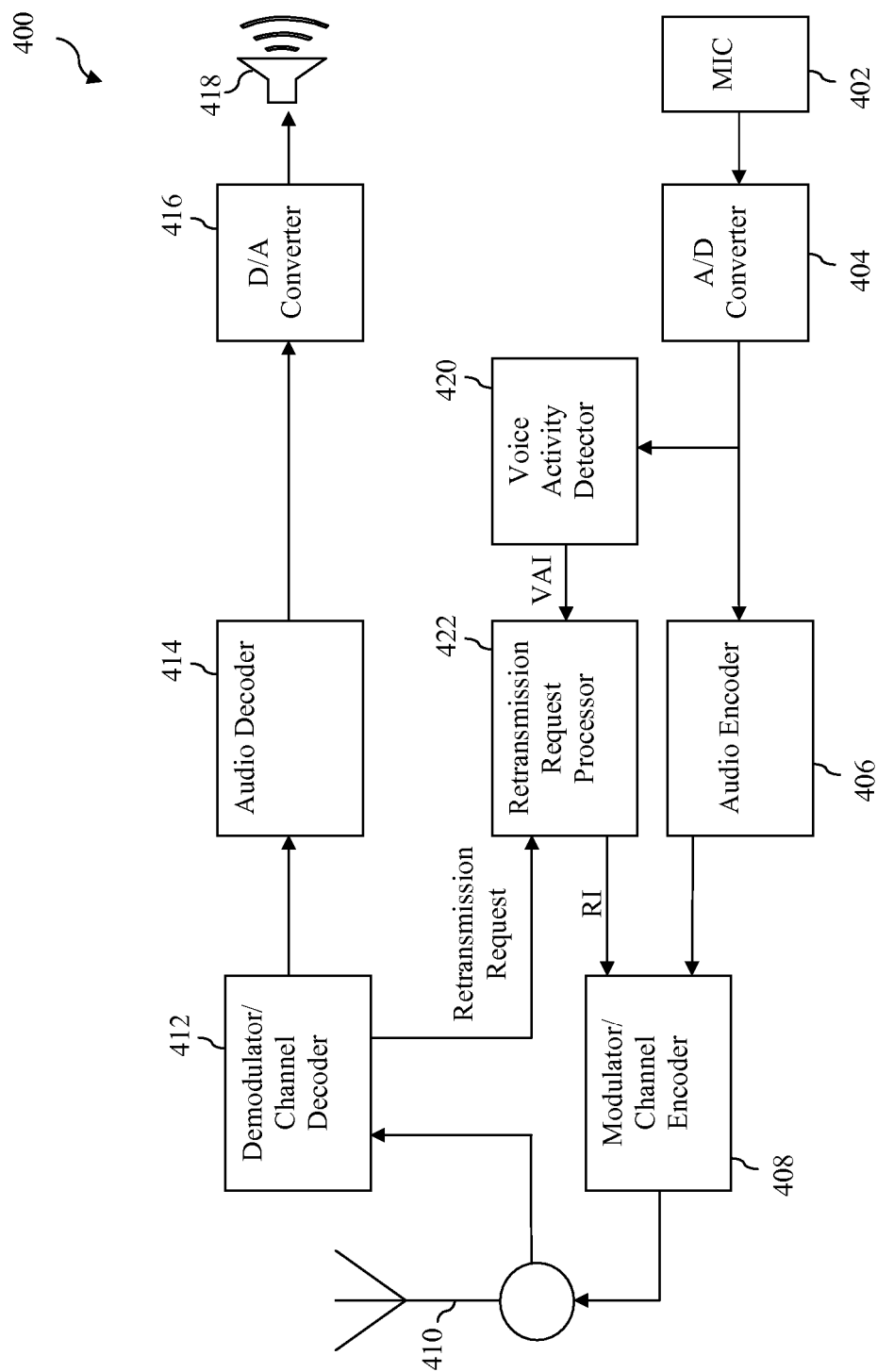
FIG. 4 is a block diagram of an example wireless communication terminal that implements a VAD-dependent retransmission request processing scheme in accordance with an embodiment of the present invention.

A terminal in accordance with an embodiment of the present invention may also reduce its own power consumption by selectively ignoring retransmission requests received from the remote terminal. FIG. 4 is a high-level block diagram of an example wireless communication terminal 400 that includes such functionality. In particular, wireless communication terminal 400 implements a VAD-dependent retransmission request processing scheme in accordance with an embodiment of the present invention.

As shown in FIG. 4, wireless communication terminal 400 comprises a number of interconnected components including a microphone 402, an A/D converter 404, an audio encoder 406, a modulator/channel encoder 408, an antenna 410, a demodulator/channel decoder 412, an audio decoder 414, a D/A converter 416 and a speaker 418. Generally speaking, each of these elements may operate in a similar fashion to like-named elements described above in reference to wireless communication terminal 100. In additional, demodulation/channel decoder 412 is configured to decode retransmission requests received from a remote wireless communication terminal via antenna 110 and to pass the retransmission requests to a retransmission request processor 422.

As further shown in FIG. 4, wireless communication terminal 400 also includes a voice activity detector 420. Voice activity detector 420 is connected to A/D converter 404 and is adapted to analyze digital audio samples produced by A/D converter 404 to determine whether or not those samples represent voice activity (i.e., human speech) or not. In an embodiment, voice activity detector 420 is configured to render a voice activity determination for each frame of digital audio samples produced by A/D converter 404. This determination may be based on an analysis of the frame itself and/or upon an analysis of one or more previously-processed frames. If voice activity detector 420 determines that a frame of digital audio signals produced by A/D converter 404 comprises voice activity, voice activity detector 420 will send a voice activity indicator (VAI) signal to retransmission request processor 422.

Figure 5:
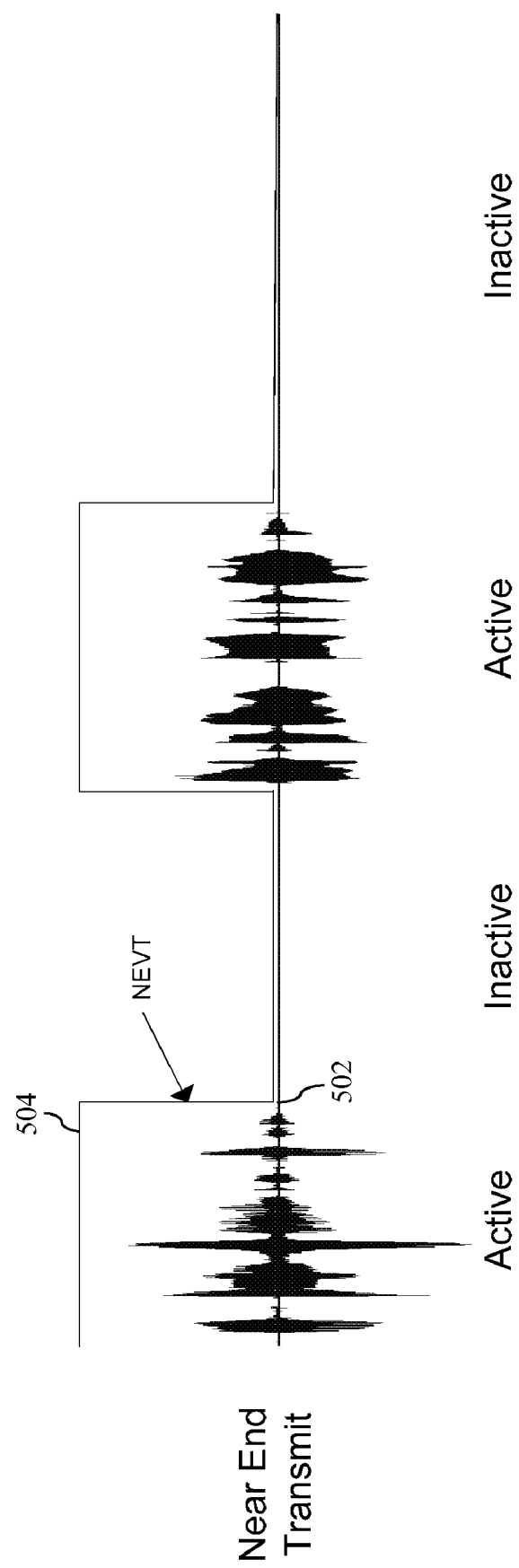
FIG. 5 illustrates an example audio signal processed by an analog-to-digital (A/D) converter and a corresponding signal produced by a voice activity detector based on an analysis of the audio signal in accordance with an embodiment of the present invention.

To further illustrate the operation of voice activity detector 420, FIG. 5 illustrates an example audio signal 502 processed by A/D converter 404 and a signal 504 overlaid thereon. Signal 504, denoted "NEVT" (for Near End VAD Transmit), is produced by voice activity detector 420 based on an analysis of audio signal 502. As shown in FIG. 5, signal 504 is generally high during periods of active speech in audio signal 502 and generally low during inactive periods. In one embodiment, signal 504 is used as the VAI signal provided to retransmission request processor 422.

Retransmission request processor 422 is connected to demodulator/channel decoder 412, voice activity detector 420 and modulator/channel encoder 408. Retransmission request processor 422 is adapted to selectively process retransmission requests received from demodulator/channel decoder 412. In an embodiment, retransmission request processor 422 will process a retransmission request when voice activity detector 420 has asserted the VAI signal, indicating that A/D converter 104 is currently producing a frame that includes active speech. Otherwise, retransmission request processor 422 will ignore the retransmission request. If retransmission request generator 122 determines that a retransmission request associated with a particular packet should be processed, retransmission request generator 122 sends a retransmit indicator (RI) signal to modulator/channel encoder 108 indicating that the particular packet should be retransmitted to the remote wireless communication terminal and, responsive to receiving this signal, modulator/channel encoder 108 retransmits the packet.

Figure 6:
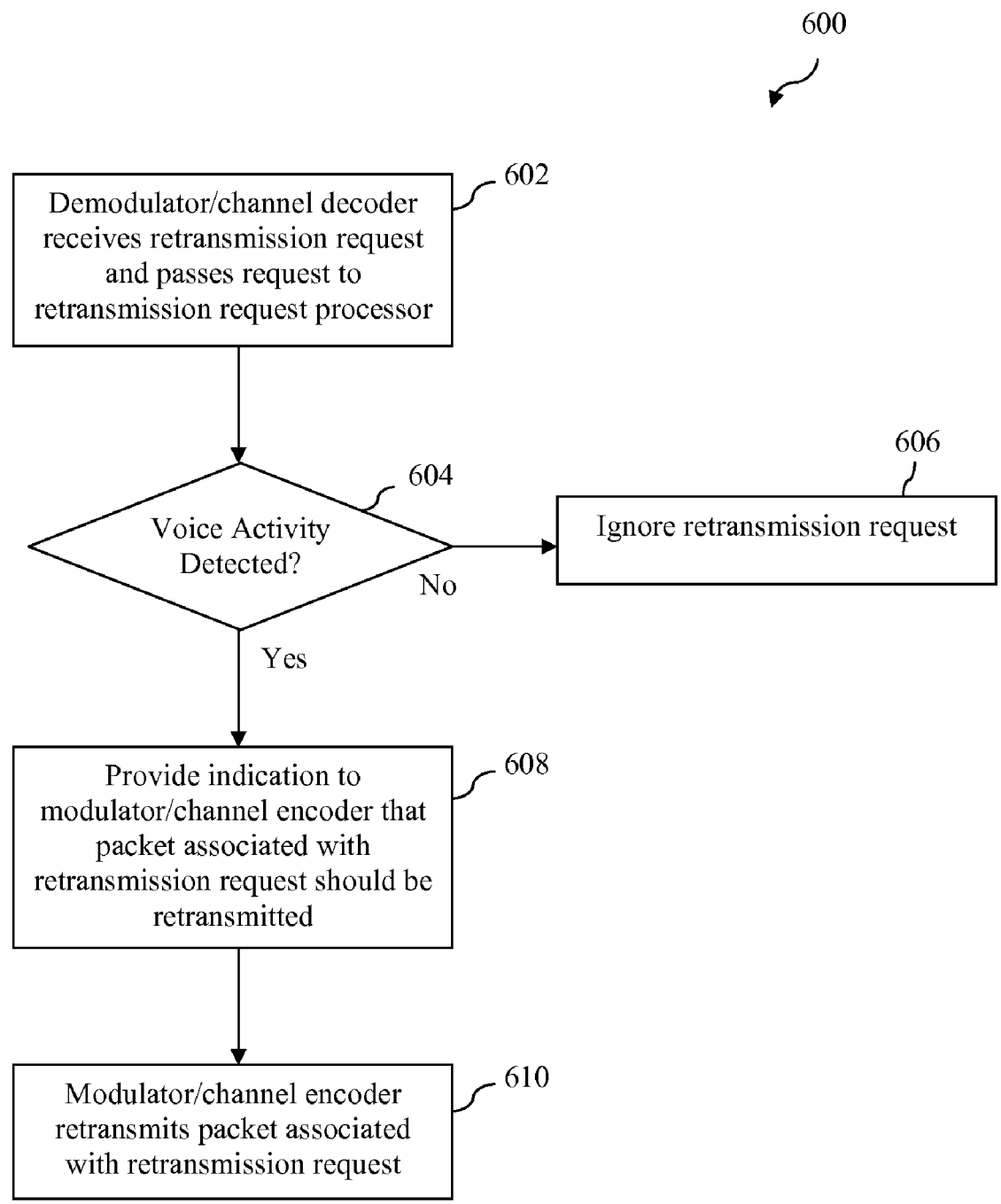
FIG. 6 depicts a flowchart of a method for performing VAD-dependent retransmission request processing in a wireless communication terminal in accordance with an embodiment of the present invention.

The manner in which terminal 400 operates to perform VAD-dependent retransmission request processing will now be further described in reference to flowchart 600 of FIG. 6. As shown in FIG. 6, the method begins at step 602 in which demodulator/channel decoder 412 receives and decodes a retransmission request from a remote wireless communication terminal via antenna 110 and passes the retransmission request to retransmission request processor 422.

Responsive to receiving the retransmission request, retransmission request processor 422 determines whether voice activity has been detected in the audio signal produced by A/D converter 104 for subsequent transmission to the remote wireless communication terminal as shown at decision step 604. As discussed above, the presence of voice activity in the audio signal is detected by voice activity detector 420 based on an analysis of at least one previously-processed frame of the audio signal and is indicated through the assertion of VAI signal.

If retransmission request processor 422 determines during decision step 604 that no voice activity has been detected, then retransmission request processor 422 ignores the retransmission request as shown at step 606. However, if retransmission request processor 422 determines during decision step 604 that voice activity has been detected, then retransmission request processor 422 provides an indication to modulator/channel encoder 408 that a packet associated with the retransmission request should be retransmitted to the remote wireless communication terminal as shown at step 608. As discussed above, retransmission request processor 422 provides this indication by sending the RI signal to modulator/channel encoder 408. Responsive to receiving this indication, modulator/channel encoder 408 retransmits the packet associated with the retransmission request to the remote wireless communication terminal as shown at step 610.

The foregoing VAD-dependent retransmission request processing scheme advantageously reduces the number of retransmissions that terminal 400 must perform due to packet loss. In accordance with this scheme, retransmission requests received from a remote terminal may be ignored (or, in an alternative implementation, reduced) when an audio signal currently being transmitted to the remote terminal is deemed not to comprise active speech. If the remote terminal does not implement a VAD-dependent retransmission request generation scheme as described above in Section B, this will force the remote terminal to employ a PLC algorithm to conceal the effect of lost packets. However, since the audio signal currently being transmitted to the remote terminal does not comprise active speech, a user of the remote terminal will perceive only insignificant performance degradation.

D. Half-Duplex and Full-Duplex Implementations

A wireless communication terminal that implements a VAD-dependent retransmission request generation and/or processing scheme in accordance with an embodiment of the present invention may be used to communicate with another wireless communication terminal that does not include such functionality. Such a configuration is referred to herein as a "half-duplex" configuration.

Figure 7:
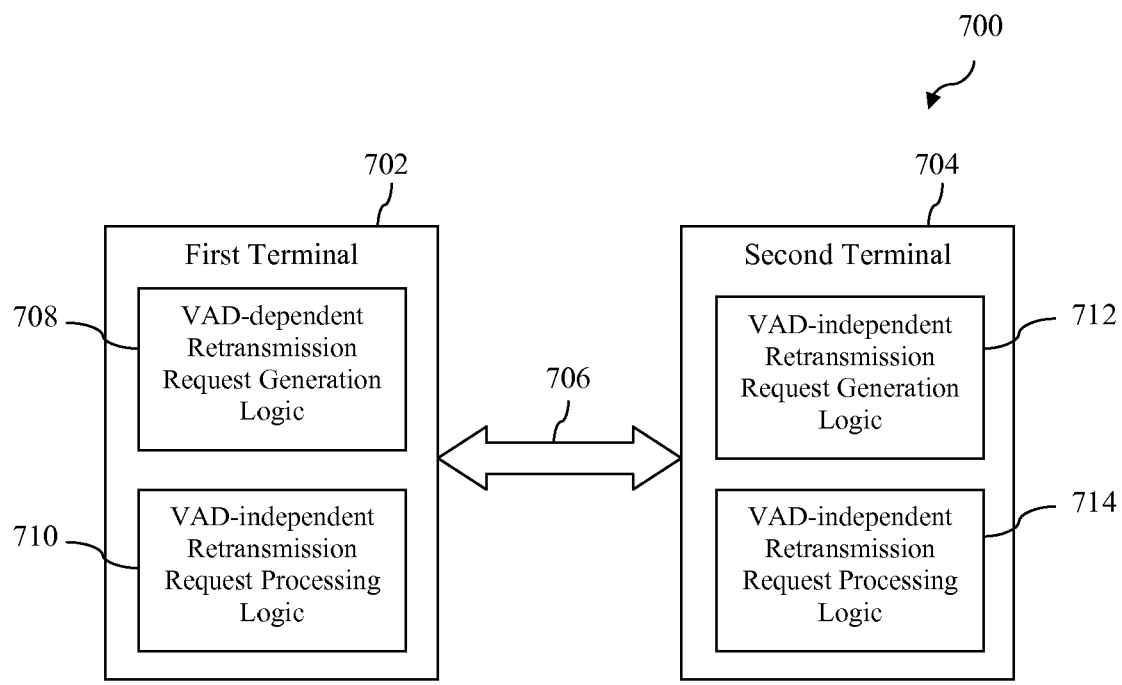
FIGS. 7 and 8 are block diagrams depicting configurations in which a wireless communication terminal that implements a VAD-dependent retransmission request generation and/or processing scheme in accordance with an embodiment of the present invention is used to communicate with another wireless communication terminal that does not include such functionality.

One example of a half-duplex configuration is shown in block diagram 700 of FIG. 7. As shown in FIG. 7, a first terminal 702 is communicatively connected to a second terminal 704 over a wireless communication channel 706. First terminal 702 includes VAD-dependent retransmission request generation logic 708 and VAD-independent retransmission request processing logic 710. VAD-dependent retransmission request generation logic 708 is configured to generate retransmission requests for lost packets in a VAD-dependent manner as described above in Section B. VAD-independent retransmission request processing logic 710 is configured to respond to retransmission requests for lost packets in a VAD-independent manner and may represent, for example, logic configured to operate in accordance with a conventional Bluetooth® retransmission scheme for eSCO channels.

As further shown in FIG. 7, second terminal 704 includes VAD-independent retransmission request generation logic 712 and VAD-independent retransmission request processing logic 714. VAD-independent retransmission request generation logic 712 is configured to generate retransmission requests for lost packets in a VAD-independent manner and may represent, for example, logic configured to operate in accordance with a conventional Bluetooth® retransmission scheme for eSCO channels. VAD-independent retransmission request processing logic 714 is configured to respond to retransmission requests for lost packets in a VAD-independent manner and may represent, for example, logic configured to operate in accordance with a conventional Bluetooth® retransmission scheme for eSCO channels.

When first terminal 702 and second terminal 704 are engaged in wireless communication over channel 706, packets carrying audio data, including speech data, are transferred bi-directionally between both terminals. When a packet received by second terminal 704 is deemed bad, VAD-independent retransmission request generation logic 712 within second terminal 704 will request retransmission of the packet provided that a maximum number of permissible retransmissions has not already been exceeded. VAD-independent retransmission request processing logic 710 within first terminal 702 will then service the request and retransmit the packet.

In contrast, when a packet received by first terminal 702 is deemed bad, VAD-dependent retransmission request generation logic 708 within first terminal 702 will request retransmission of the packet only if the audio data currently being received from second terminal 704 is deemed to comprise active speech and the maximum number of permissible retransmissions has not already been exceeded. The result of this is that VAD-dependent retransmission request processing logic 714 within second terminal 704 will receive fewer retransmission requests from first terminal 702 than it would if logic 708 within first terminal 702 operated in a VAD-independent manner. Consequently, the use of VAD-dependent retransmission request generation logic 708 by first terminal 702 results in a power savings for second terminal 704. The use of such a configuration may be deemed particularly desirable where, for example, second terminal 704 comprises a device that is more power-constrained than first terminal 702. For example, the use of such a scheme may be deemed particularly desirable where second terminal 704 comprises a Bluetooth® headset and first terminal 702 comprises a Bluetooth®-enabled telephone that is less power-constrained than the headset.

The use of VAD-dependent retransmission request generation logic 708 by first terminal 702 will also reduce the amount of power consumed by first terminal 702, since first terminal 702 will have less retransmitted packets to receive, demodulate, decode and process.

Figure 8:
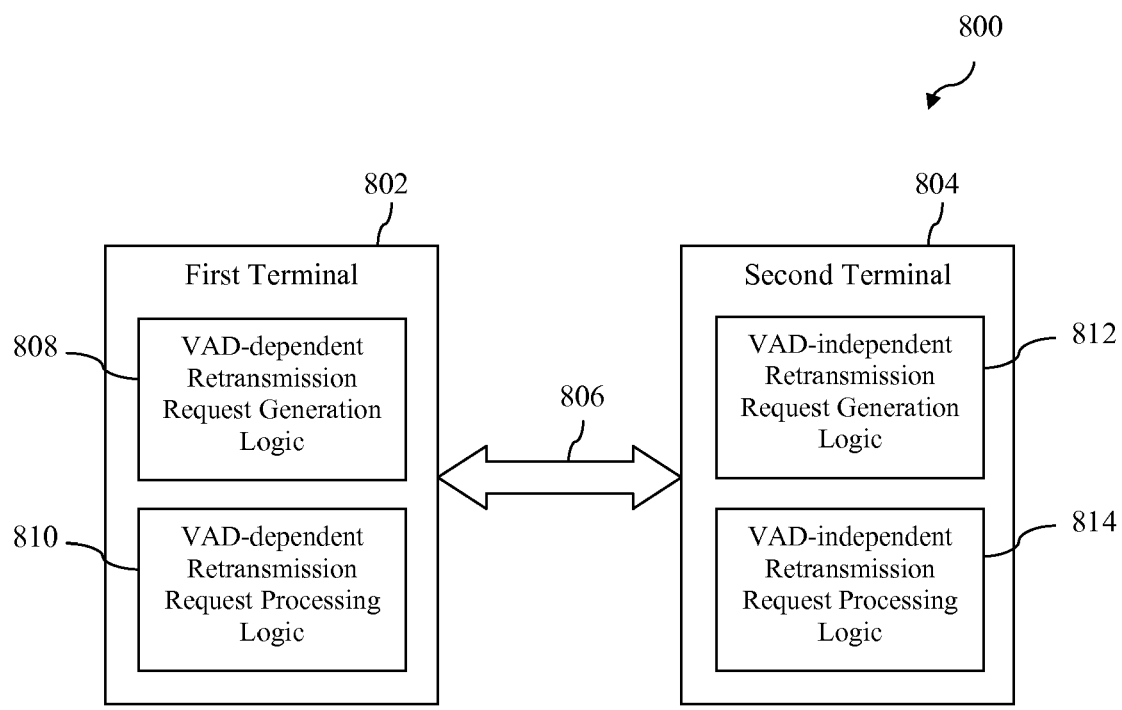

Another example of a half-duplex configuration is shown in block diagram 800 of FIG. 8. As shown in FIG. 8, a first terminal 802 is communicatively connected to a second terminal 804 over a wireless communication channel 806. First terminal 802 includes VAD-dependent retransmission request generation logic 808 and VAD-dependent retransmission request processing logic 810. VAD-dependent retransmission request generation logic 808 is configured to generate retransmission requests for lost packets in a VAD-dependent manner as described above in Section B. VAD-dependent retransmission request processing logic 810 is configured to respond to retransmission requests for lost packets in a VAD-dependent manner as described above in Section C.

As further shown in FIG. 8, second terminal 804 includes VAD-independent retransmission request generation logic 812 and VAD-independent retransmission request processing logic 814, which are analogous to VAD-independent retransmission request generation logic 712 and VAD-independent retransmission request processing logic 714 described above in reference to FIG. 7.

In the half-duplex configuration of FIG. 8, second terminal 804 achieves a power savings for the same reasons described above in reference to FIG. 7. However, first terminal 802 also achieves a power savings due to the operation of VAD-dependent retransmission request processing logic 810 which selectively ignores retransmission requests from second terminal 804 when the audio data being transmitted to second terminal 804 is deemed not to comprise active speech. When a retransmission request is ignored in this manner, second terminal 804 will be forced to employ a PLC algorithm to conceal the effect of a lost packet. However, since the audio data being transmitted to second terminal 804 does not comprise active speech, a user of second terminal 804 will perceive only insignificant performance degradation.

It is noted that the half-duplex configuration of FIG. 8 may be deemed most beneficial where both first terminal 802 and second terminal 804 are configured for a maximum of one retransmission per packet. If second terminal 804 were configured for more than one more retransmission per packet, then the ignoring of retransmission requests generated by second terminal 804 by first terminal 802 will result in the generation of subsequent retransmission requests by second terminal 804, which will consume additional power.

Figure 9:
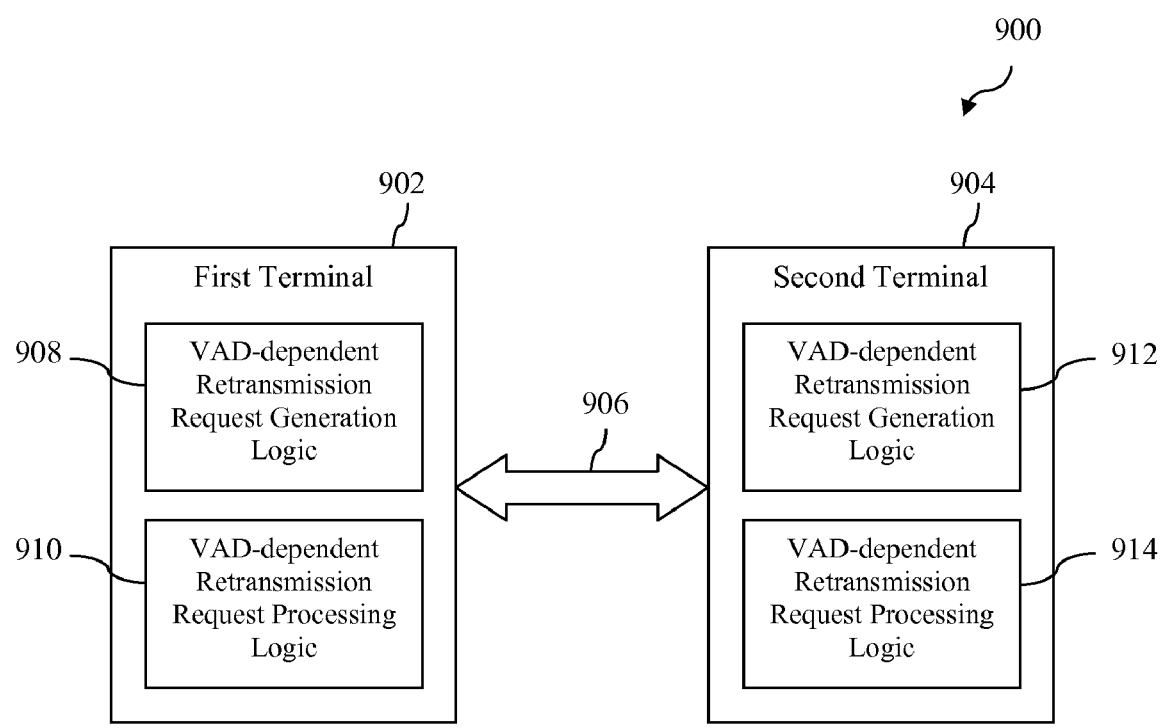
FIG. 9 is a block diagram depicting a configuration in which two wireless communication terminals, each of which implements a VAD-dependent retransmission request generation and processing scheme in accordance with an embodiment of the present invention, are used to communicate with each other.

FIG. 9 depicts a block diagram 900 of a full-duplex configuration in which two wireless communication terminals, each of which implements a VAD-dependent retransmission request generation and processing scheme in accordance with an embodiment of the present invention, are used to communicate with each other.

In particular, as shown in FIG. 9, a first terminal 902 is communicatively connected to a second terminal 904 over a wireless communication channel 906. First terminal 902 includes VAD-dependent retransmission request generation logic 908 and VAD-dependent retransmission request processing logic 910. VAD-dependent retransmission request generation logic 908 is configured to generate retransmission requests for lost packets in a VAD-dependent manner as described above in Section B. VAD-dependent retransmission request processing logic 910 is configured to respond to retransmission requests for lost packets in a VAD-dependent manner as will be described below.

As further shown in FIG. 9, second terminal 904 includes VAD-dependent retransmission request generation logic 912 and VAD-dependent retransmission request processing logic 914. VAD-dependent retransmission request generation logic 912 is configured to generate retransmission requests for lost packets in a VAD-dependent manner as described above in Section B. VAD-dependent retransmission request processing logic 914 is configured to respond to retransmission requests for lost packets in a VAD-dependent manner as will be described below.

Figure 10:
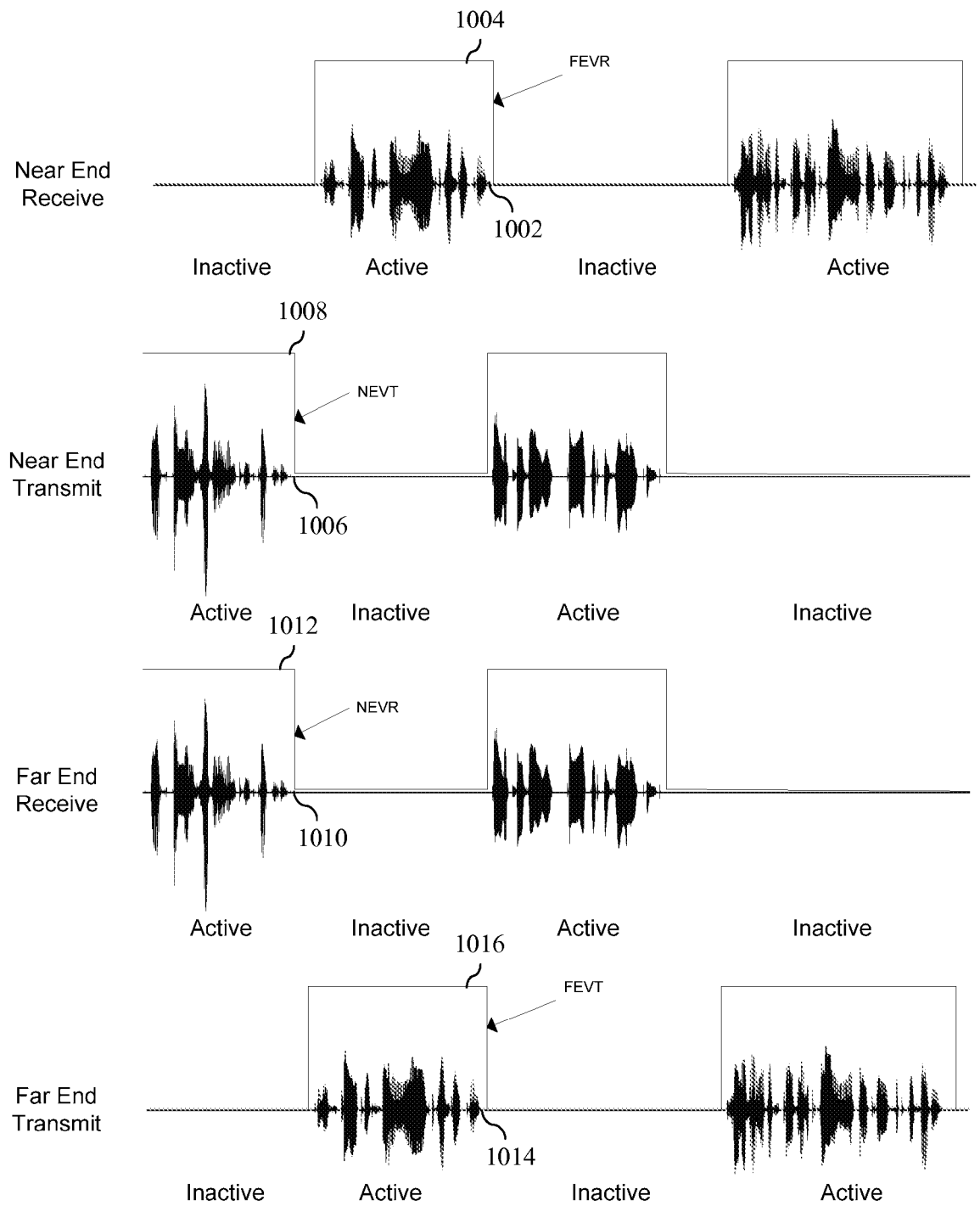
FIG. 10 depicts example signals analyzed and generated by the wireless communication terminals of FIG. 9.

In this configuration, first terminal 902 monitors an audio signal transmitted by second terminal 904 and only generates retransmission requests for lost packets when the audio signal is deemed to include active speech. For example, with reference to FIG. 10, first terminal 902 may monitor an audio signal 1002 transmitted by second terminal 904 and enable the generation of retransmission requests when a corresponding VAD-generated signal 1004, denoted "FEVR" (for Far End VAD Receive), is active.

In a like manner, second terminal 904 monitors an audio signal transmitted by first terminal 904 and only generates retransmission requests for lost packets when the audio signal is deemed to include active speech. For example, with continued reference to FIG. 10, second terminal 904 may monitor an audio signal 1010 transmitted by first terminal 904 and enable the generation of retransmission requests when a corresponding VAD-generated signal 1012, denoted "NEVR" (for Near End VAD Receive), is active.

Since VAD-generated signal 1012 is computed on audio signal 1010 transmitted by first terminal 902, first terminal 902 can employ VAD on a similar version of the same audio signal prior to transmission. For example, first terminal 902 can employ VAD on analogous audio signal 1006 to generate the corresponding signal 1008, denoted "NEVT" (for Near End VAD Transmit). Audio signal 1006 is approximately equal to audio signal 1010. In fact, it is essentially identical in the absence of bit-errors and packet loss. As a result, VAD-generated signal 1008 and VAD-generated signal 1012 will be approximately equivalent. Since second terminal 904 will only request retransmissions when VAD-generated signal 1012 is active, VAD-dependent retransmission request processing logic 910 within first terminal 902 can monitor VAD-generated signal 1008 and disable the retransmission capability entirely when VAD-generated signal 1008 is inactive. Disabling the retransmission capability entirely may entails turning off an antenna that monitors wireless communication channel 906 for retransmission requests and/or turning off a demodulator/channel decoder that demodulates and decodes such retransmission requests, which serves to conserve more power than ignoring retransmission requests after such requests have been received, demodulated and decoded (as described in the embodiment of Section C above).

In a like manner, VAD-dependent retransmission request processing logic 914 within second terminal 904 can monitor a VAD-generated signal 1016 that is calculated on an audio signal 1014 to be transmitted to first terminal 902 and disable the retransmission capability entirely when VAD-generated signal 1016 is inactive.

E. Example Simulation Results Based on Various Implementations

An implementation of the present invention designed for use with Bluetooth® eSCO channels was simulated using a voice activity detector and PLC algorithm. The test file used for the simulation contained 46% active speech, which is typical of a two-way conversation. The system was tested in a silent (clean) environment and in background babble conditions. The PESQ (Perceptual Evaluation of Speech Quality) was computed in active speech regions. In all of the results described herein, "0-retran" describes a reference system with no retransmissions, "1-retran" describes a reference system with 1 retransmission per packet, while "1-retran-vad" describes a system that performs VAD-dependent retransmissions in accordance with an embodiment of the present invention with a maximum of one retransmission per packet.

Figure 11:
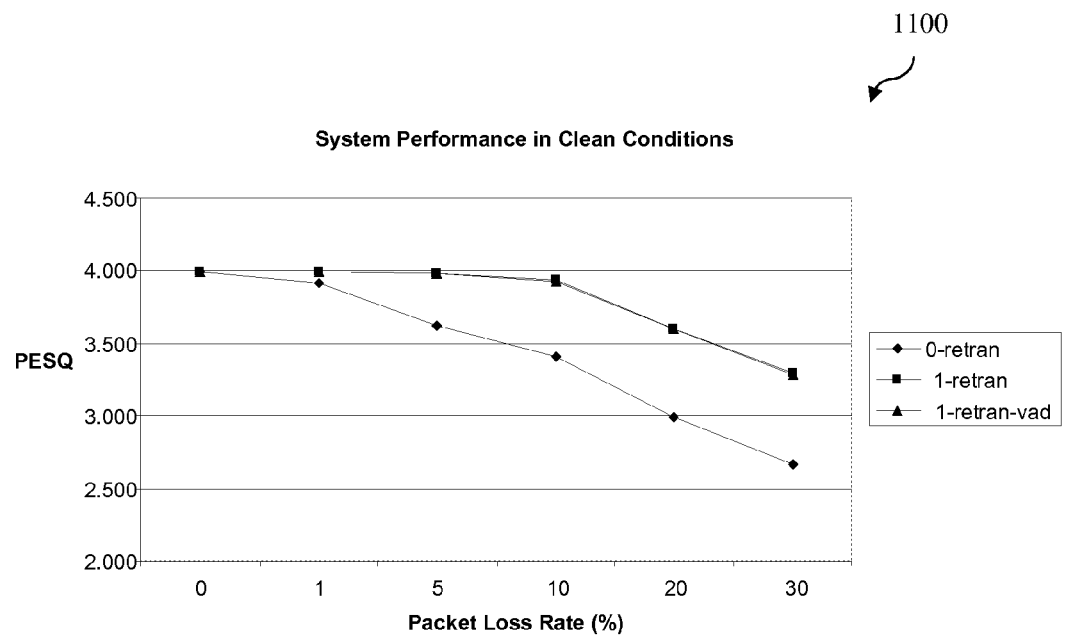
FIG. 11 depicts a graph that shows the performance in clean conditions of a system that implements a VAD-dependent retransmission scheme in accordance with an embodiment of the present invention as compared to two reference systems.

FIG. 11 depicts a graph 1100 that shows the results of the simulation in clean conditions. In particular, graph 1100 shows the quality (PESQ) produced by each system as a function of different packet loss rates. As shown in FIG. 11, the system in accordance with an embodiment of the present invention "1-retran-vad" yields essentially equivalent performance compared to the reference system "1-retran" and both significantly outperform the reference system "0-retran" with no retransmissions.

Figure 12:
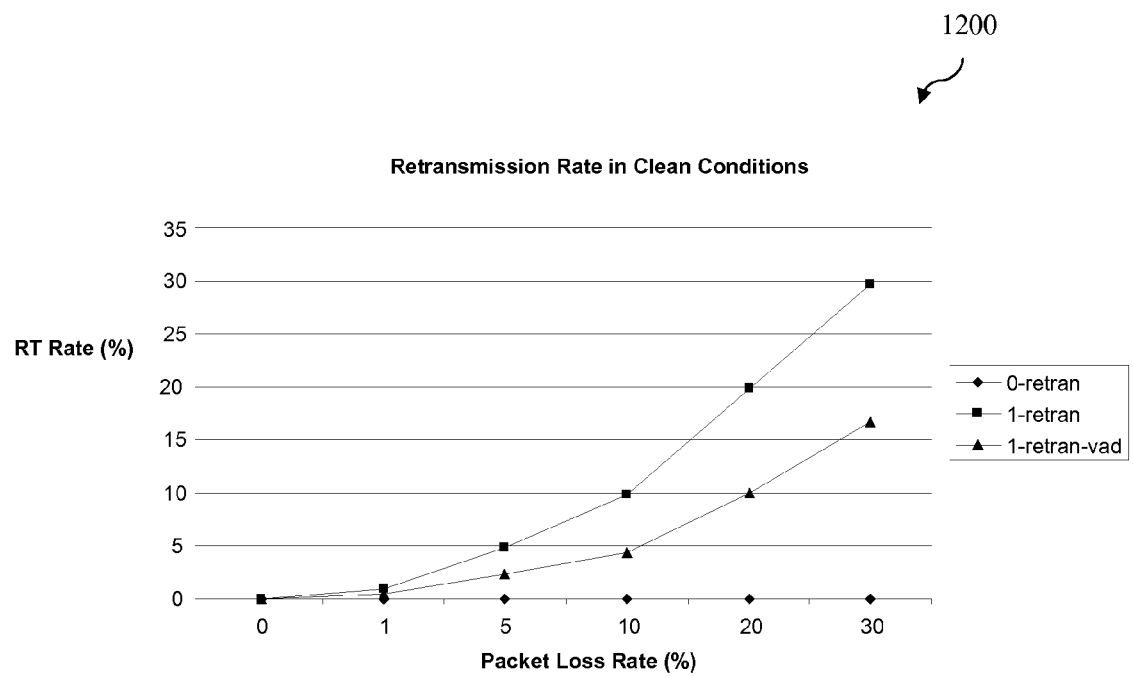
FIG. 12 depicts a graph that shows the retransmission rate in clean conditions of a system that implements a VAD-dependent retransmission scheme in accordance with an embodiment of the present invention as compared to two reference systems.
Figure 13:
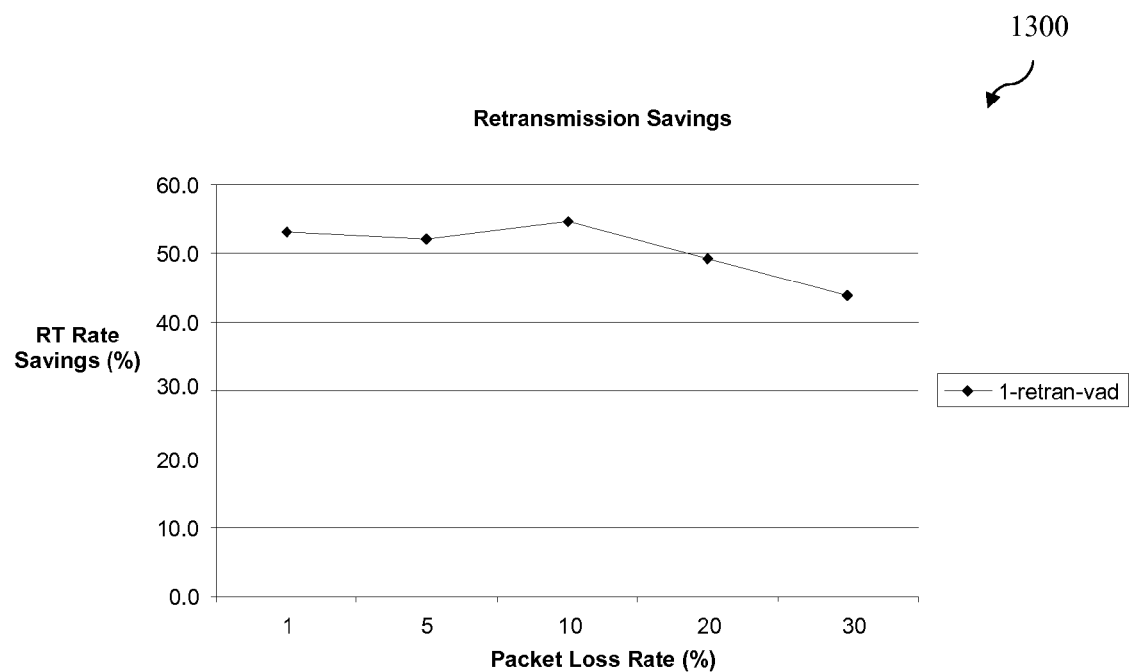
FIG. 13 depicts a graph that shows a retransmission rate savings for a system that implements a VAD-dependent retransmission scheme in accordance with an embodiment of the present.

However, audio quality is not the only relevant measurement. FIG. 12 depicts a graph 1200 that shows the retransmission (RT) rate of each system as a function of different packet loss rates. From graph 1200, it can be seen that the inventive VAD-based system requests retransmissions at about half the rate of the "1-retran" reference system. For example, for a packet loss rate of 20%, the reference system "1-retran" requests retransmissions 20% of the time (which is to be expected, as the system retransmits every time there is packet loss), while the inventive system "1-retran-vad" requests retransmissions about 10% of the time. With the test file containing 54% silence, it is expected that the inventive VAD-based system should retransmit about half as often. This can be seen more clearly in graph 1300 of FIG. 13, which shows that the retransmission (RT) rate savings as a function of packet loss rate. As shown in graph 1300, the inventive VAD-based retransmission scheme indeed reduces the retransmission rate by 50% or more.

It is noted in reference to graph 1300 that the savings drops a bit as the packet loss rate increases due to a constraint added to the VAD-based retransmission logic to avoid consecutive packet losses. In accordance with this constraint, the retransmission request generation logic will always request retransmission if the previous packet was also lost. This constraint was added to avoid generation of potential artifacts by the PLC algorithm due to consecutive packet losses.

Figure 14:
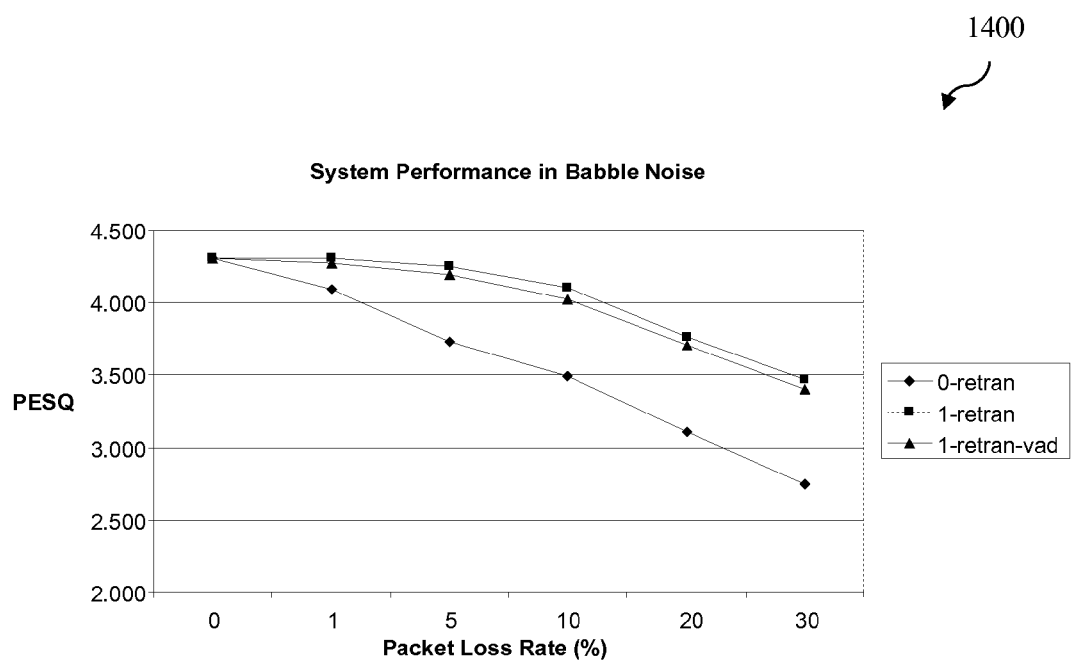
FIG. 14 depicts a graph that shows the performance in babble noise of a system that implements a VAD-dependent retransmission scheme in accordance with an embodiment of the present invention as compared to two reference systems.
Figure 15:
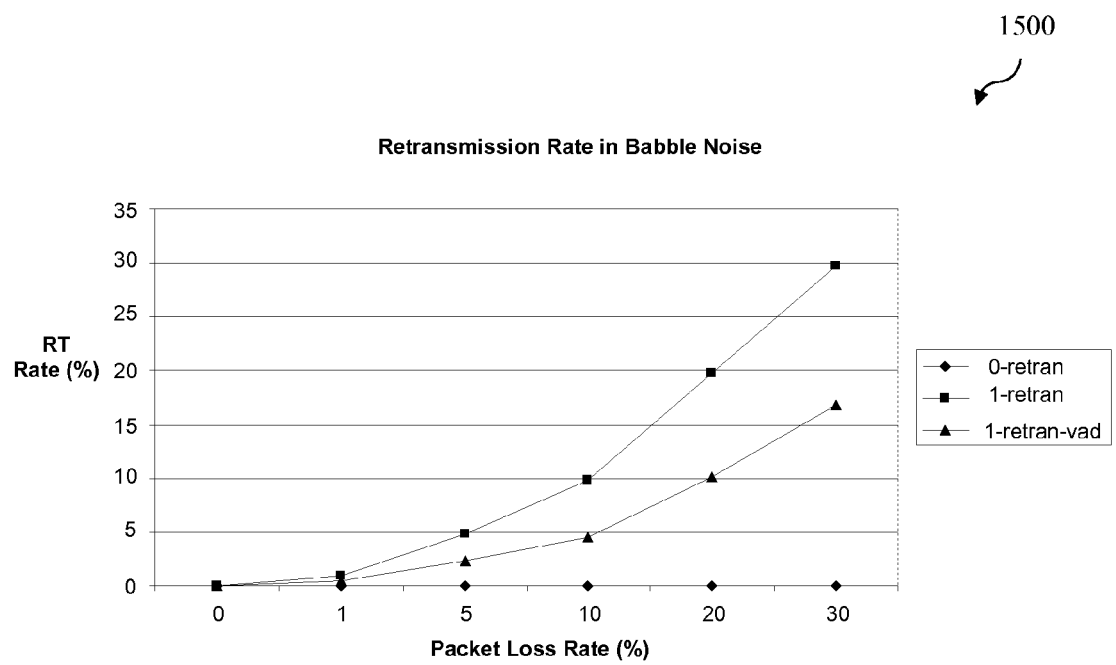
FIG. 15 depicts a graph that shows the retransmission rate in babble noise of a system that implements a VAD-dependent retransmission scheme in accordance with an embodiment of the present invention as compared to two reference systems.

FIG. 14 depicts a graph 1400 that shows the results of the simulation in babble noise. The results here are similar to the clean condition case depicted in graph 1100 of FIG. 11 with the inventive VAD-based system yielding essentially equivalent audio quality to the "1-retran" reference system. Graph 1500 of FIG. 15 depicts the retransmission rate in babble noise and indicates essentially identical results as compared with the clean condition case.

Figure 16:
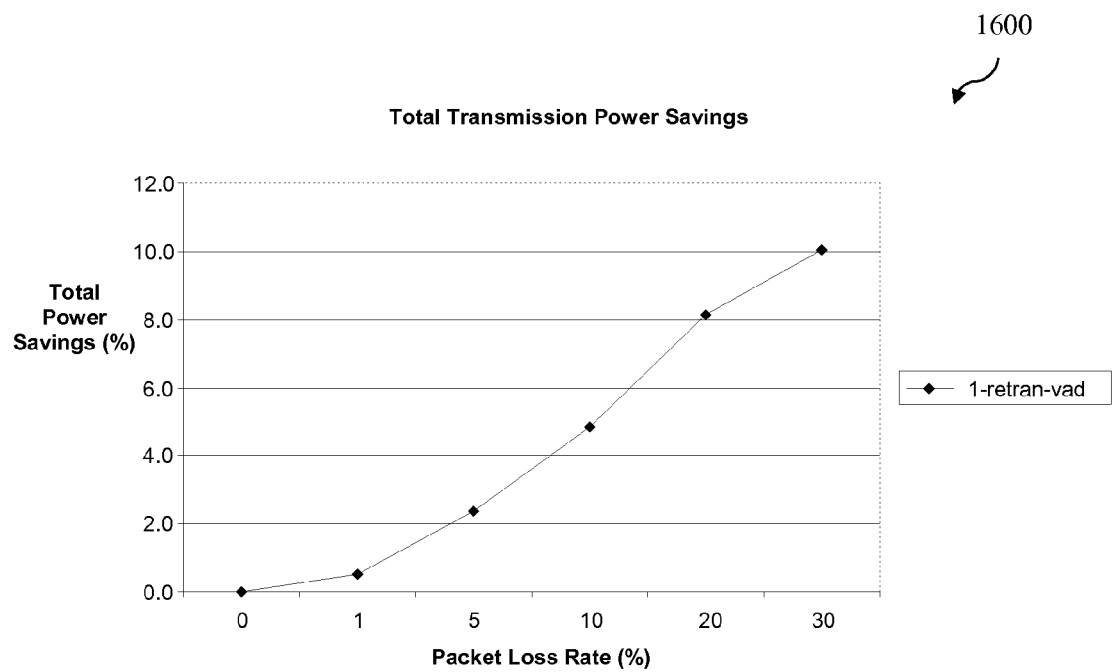
FIG. 16 depicts a graph that shows the total transmission power savings of a system that implements a VAD-dependent retransmission scheme in accordance with an embodiment of the present invention.

An interesting finding is obtained by considering the total transmission power savings. In this case, the original transmission is also included in the computation. The results are depicted in graph 1600 of FIG. 16, which shows the total power savings as a function of packet loss rate. As shown in graph 1600, the inventive VAD-based retransmission scheme can provide significant overall transmission power savings.

F. Example Computer System Implementation

Certain elements of the terminals depicted in FIGS. 1, 4, 7, 8, and 9 and certain steps of the flowcharts depicted in FIGS. 3 and 6 may be implemented by one or more processor-based computer systems. An example of such a computer system 1700 is depicted in FIG. 17.

Figure 17:
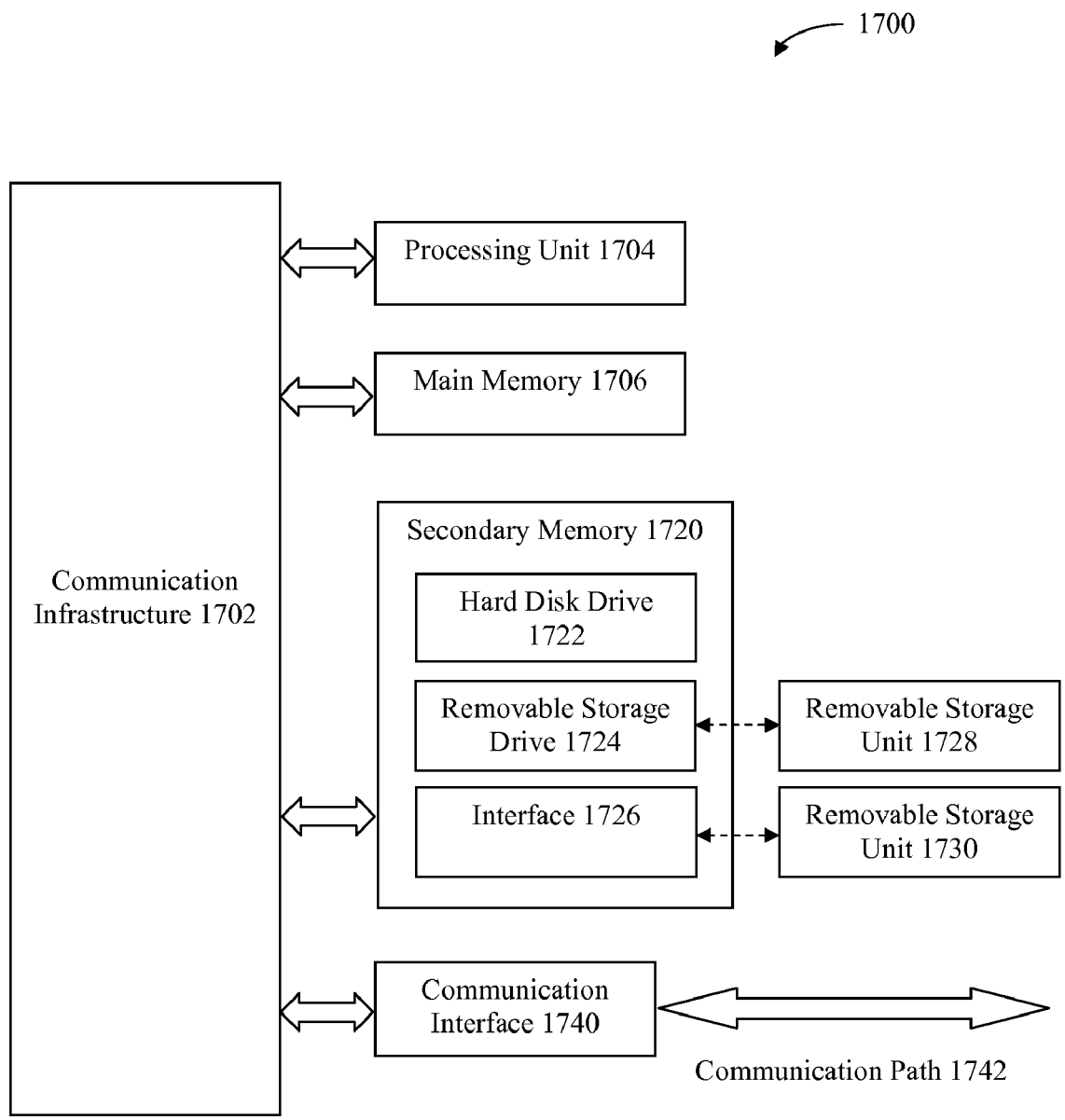
FIG. 17 is a block diagram of an example computer system that may be used to implement aspects of the present invention.

As shown in FIG. 17, computer system 1700 includes a processing unit 1704 that includes one or more processors. Processor unit 1704 is connected to a communication infrastructure 1702, which may comprise, for example, a bus or a network.

Computer system 1700 also includes a main memory 1706, preferably random access memory (RAM), and may also include a secondary memory 1720. Secondary memory 1720 may include, for example, a hard disk drive 1722, a removable storage drive 1724, and/or a memory stick. Removable storage drive 1724 may comprise a floppy disk drive, a magnetic tape drive, an optical disk drive, a flash memory, or the like.

Removable storage drive 1724 reads from and/or writes to a removable storage unit 1728 in a well-known manner. Removable storage unit 1728 may comprise a floppy disk, magnetic tape, optical disk, or the like, which is read by and written to by removable storage drive 1724. As will be appreciated by persons skilled in the relevant art(s), removable storage unit 1728 includes a computer usable storage medium having stored therein computer software and/or data.

In alternative implementations, secondary memory 1720 may include other similar means for allowing computer programs or other instructions to be loaded into computer system 1700. Such means may include, for example, a removable storage unit 1730 and an interface 1726. Examples of such means may include a program cartridge and cartridge interface (such as that found in video game devices), a removable memory chip (such as an EPROM, or PROM) and associated socket, and other removable storage units 1730 and interfaces 1726 which allow software and data to be transferred from the removable storage unit 1730 to computer system 1700.

Computer system 1700 may also include a communication interface 1740. Communication interface 1740 allows software and data to be transferred between computer system 1700 and external devices. Examples of communication interface 1740 may include a modem, a network interface (such as an Ethernet card), a communications port, a PCM-CIA slot and card, or the like. Software and data transferred via communication interface 1740 are in the form of signals which may be electronic, electromagnetic, optical, or other signals capable of being received by communication interface 1740. These signals are provided to communication interface 1740 via a communication path 1742. Communications path 1742 carries signals and may be implemented using wire or cable, fiber optics, a phone line, a cellular phone link, an RF link and other communications channels.

As used herein, the terms "computer program medium" and "computer readable medium" are used to generally refer to media such as removable storage unit 1728, removable storage unit 1730 and a hard disk installed in hard disk drive 1722. Computer program medium and computer readable medium can also refer to memories, such as main memory 1706 and secondary memory 1720, which can be semiconductor devices (e.g., DRAMs, etc.). These computer program products are means for providing software to computer system 1700.

Computer programs (also called computer control logic, programming logic, or logic) are stored in main memory 1706 and/or secondary memory 1720. Computer programs may also be received via communication interface 1740. Such computer programs, when executed, enable computer system 1700 to implement features of the present invention as discussed herein. Accordingly, such computer programs represent controllers of computer system 1700. Where the invention is implemented using software, the software may be stored in a computer program product and loaded into computer system 1700 using removable storage drive 1724, interface 1726, or communication interface 1740.

The invention is also directed to computer program products comprising software stored on any computer readable medium. Such software, when executed in one or more data processing devices, causes a data processing device(s) to operate as described herein. Embodiments of the present invention employ any computer readable medium, known now or in the future. Examples of computer readable mediums include, but are not limited to, primary storage devices (e.g., any type of random access memory) and secondary storage devices (e.g., hard drives, floppy disks, CD ROMs, zip disks, tapes, magnetic storage devices, optical storage devices, MEMs, nanotechnology-based storage device, etc.).

G. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for selectively issuing retransmission requests by a terminal in a wireless communication system, comprising:
   determining whether a packet received over a wireless channel from a remote terminal and carrying encoded audio samples representative of a frame of an audio signal is deemed bad;
   responsive to determining that the packet is deemed bad:
     determining whether voice activity has been detected in the audio signal based on an analysis of at least one previously-received frame of the audio signal;
     determining if an immediately preceding packet was lost;
   generating a retransmission request for the packet for transmission to the remote terminal responsive to determining that voice activity has been detected; and
   generating a retransmission request for the packet for transmission to the remote terminal responsive to determining that voice activity has not been detected and the immediately preceding packet was lost.

2. The method of claim 1, wherein determining whether a packet received over a wireless channel and carrying audio samples representative of a frame of an audio signal is deemed bad comprises:
   performing error detection and/or error correction operations on the packet.

3. The method of claim 1, wherein the wireless channel comprises a Bluetooth® Extended Synchronous Connection Oriented (eSCO) channel.

4. The method of claim 1, wherein determining whether voice activity has been detected in the audio signal comprises:
   analyzing at least one frame of the audio signal output from an audio decoder.

5. The method of claim 1, wherein generating a retransmission request for the packet for transmission to the remote terminal responsive to determining that voice activity has been detected comprises:
   generating a retransmission request for the packet responsive to determining that voice activity has been detected and that a maximum number of retransmission requests has not been reached for the packet.

6. The method of claim 1, further comprising:
   sending a signal indicating that the packet is lost to packet loss concealment logic responsive to determining that voice activity has not been detected; and
   synthesizing digital audio samples corresponding to the encoded audio samples in the packet loss concealment logic responsive to receiving the signal indicating that the packet is lost.

7. A terminal for use in a wireless communication system, comprising:
- a demodulator/channel decoder configured to determine whether a packet received over a wireless channel from a remote terminal and carrying encoded audio samples representative of a frame of an audio signal is deemed bad;
- a voice activity detector configured to determine whether voice activity has been detected in the audio signal based on an analysis of at least one previously-received frame of the audio signal; and
- a retransmission request generator connected to the demodulator/channel decoder and the voice activity detector, the retransmission request generator configured to generate a retransmission request for the packet for transmission to the remote terminal responsive to a combination of a determination by the demodulator/channel decoder that the packet is deemed bad and a determination by the voice activity detector that voice activity has been detected in the audio signal, the retransmission request generator being further configured to generate a retransmission request for the packet for transmission to the remote terminal responsive to a combination of a determination by the demodulator/channel decoder that the packet is deemed bad, a determination by the voice activity detector that voice activity has not been detected in the audio signal, and a determination that an immediately preceding packet was lost.

8. The terminal of claim 7, wherein the terminal comprises a wireless headset.

9. The terminal of claim 7, wherein the terminal comprises a cellular telephone.

10. The terminal of claim 7, wherein the demodulator/channel decoder is configured to determine whether the packet is deemed bad by performing error detection and/or error correction operations on the packet.

11. The terminal of claim 7, wherein the wireless channel comprises a Bluetooth® Extended Synchronous Connection Oriented (eSCO) channel.

12. The terminal of claim 7, further comprising:
- an audio decoder connected to the demodulator/channel decoder and the voice activity detector;
- wherein the voice activity detector is configured to determine whether voice activity has been detected in the audio signal by analyzing at least one frame of the audio signal output by the audio decoder.

13. The terminal of claim 7, wherein the retransmission request generator is configured to generate the retransmission request for the packet responsive to a determination by the demodulator/channel decoder that the packet is deemed bad, to a determination by the voice activity detector that voice activity has been detected in the audio signal, and to a determination that a maximum number of retransmission requests has not been reached for the packet.

14. The terminal of claim 7, further comprising:
- packet loss concealment logic connected to the retransmission request generator;
- wherein the retransmission request generator is further configured to send a signal indicating that the packet is lost to the packet loss concealment logic responsive to a determination by the demodulator/channel decoder that the packet is deemed bad and to a determination by the voice activity detector that voice activity has not been detected, and
- wherein the packet loss concealment logic is configured to synthesize digital audio samples corresponding to the encoded audio samples responsive to receiving the signal indicating that the packet is lost.

15. A method for managing the processing of retransmission requests by a terminal in a wireless communication system, comprising:
- monitoring an audio signal to be transmitted to a remote terminal over a wireless channel to determine whether voice activity has been detected in the audio signal; and
- turning off logic that demodulates/decodes such retransmission requests responsive to determining that no voice activity has been detected in the audio signal.

16. The method of claim 15, further comprising:
- turning off an antenna that monitors the wireless channel for retransmission requests from the remote terminal responsive to determining that no voice activity has been detected in the audio signal.

17. The method of claim 15, wherein the wireless channel comprises a Bluetooth® Extended Synchronous Connection Oriented (eSCO) channel.

18. The method of claim 15, wherein monitoring an audio signal to be transmitted to a remote terminal over a wireless channel to determine whether voice activity has been detected in the audio signal comprises:
- analyzing at least one frame of the audio signal output from an analog-to-digital converter.

19. The method of claim 1, wherein generating a retransmission request for the packet for transmission to the remote terminal responsive to determining that voice activity has not been detected and that the previous packet was lost comprises:
- generating a retransmission request for the packet responsive to determining that voice activity has not been detected, that the previous packet was lost and that a maximum number of retransmission requests has not been reached for the packet.

20. The terminal of claim 7, wherein the retransmission request generator further configured to generate a retransmission request for the packet for transmission to the remote terminal responsive to a determination by the demodulator/channel decoder that the packet is deemed bad, to a determination by the voice activity detector that voice activity has not been detected in the audio signal, to a determination that a previous packet was lost and to a determination that a maximum number of retransmission requests has not been reached for the packet.

21. A terminal for use in a wireless communication system, comprising:
- a voice activity detector configured to determine whether voice activity has been detected in an audio signal to be transmitted to a remote terminal over a wireless channel;
- an antenna configured to monitor the wireless channel for retransmission requests from the remote terminal; and
- logic configured to demodulate/decode such retransmission requests;
- wherein the terminal is operable to turn off the logic configured to demodulate/decode such retransmission requests responsive to a determination by the voice activity detector that voice activity has not been detected in the audio signal.

22. The terminal of claim 21, wherein the terminal is further operable to turn off the antenna responsive to the determination by the voice activity detector that voice activity has not been detected in the audio signal.

* * * * *